Sept. 18, 1928.
R. P. KINKEL
1,684,448
METHOD OF TREATING GARBAGE AND THE LIKE
Filed March 21, 1925 — 5 Sheets-Sheet 1
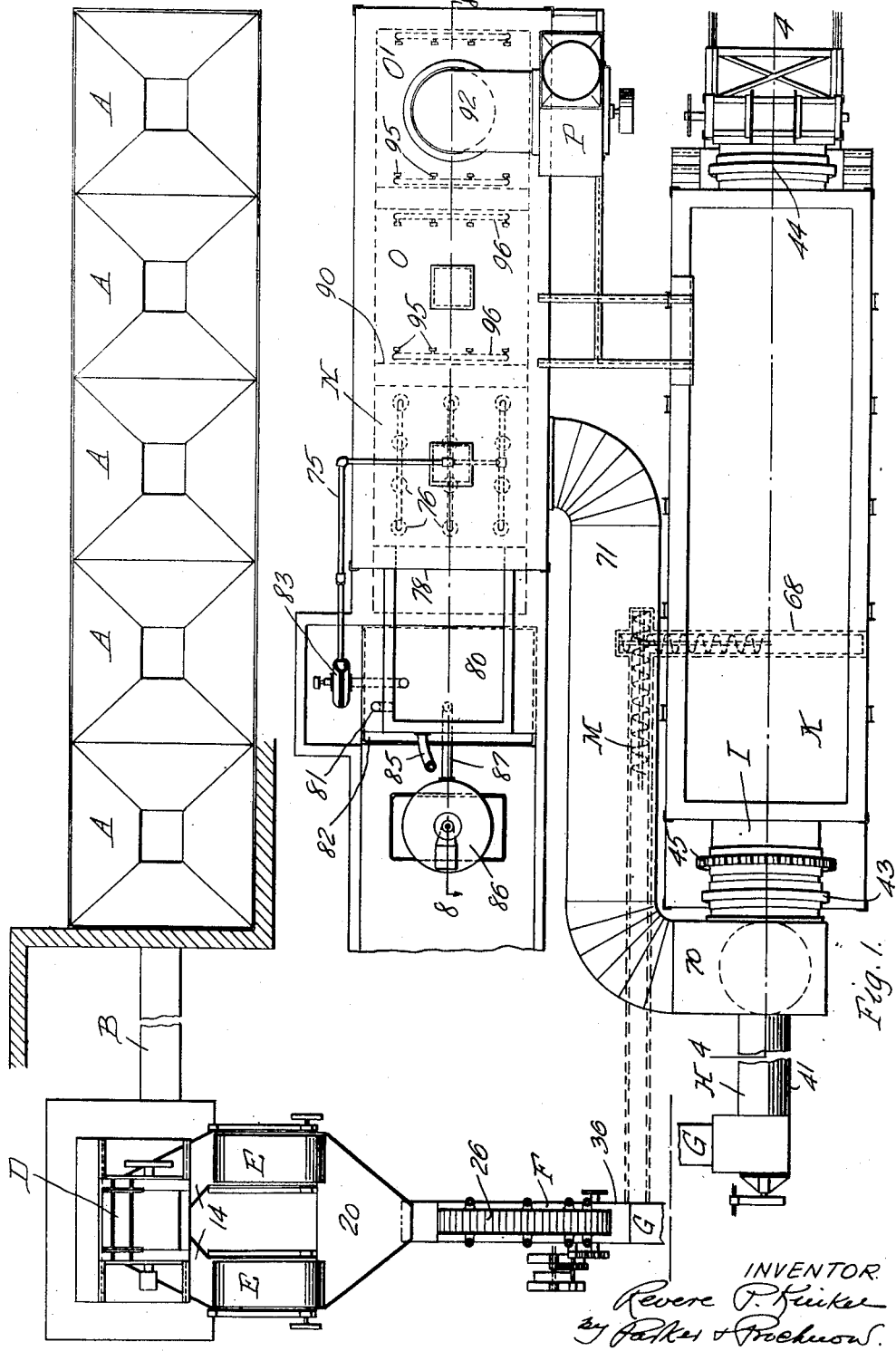
INVENTOR
ATTORNEYS Sept. 18, 1928.
R. P. KINKEL
1,684,448
METHOD OF TREATING GARBAGE AND THE LIKE
Filed March 21, 1925    5 Sheets-Sheet 2
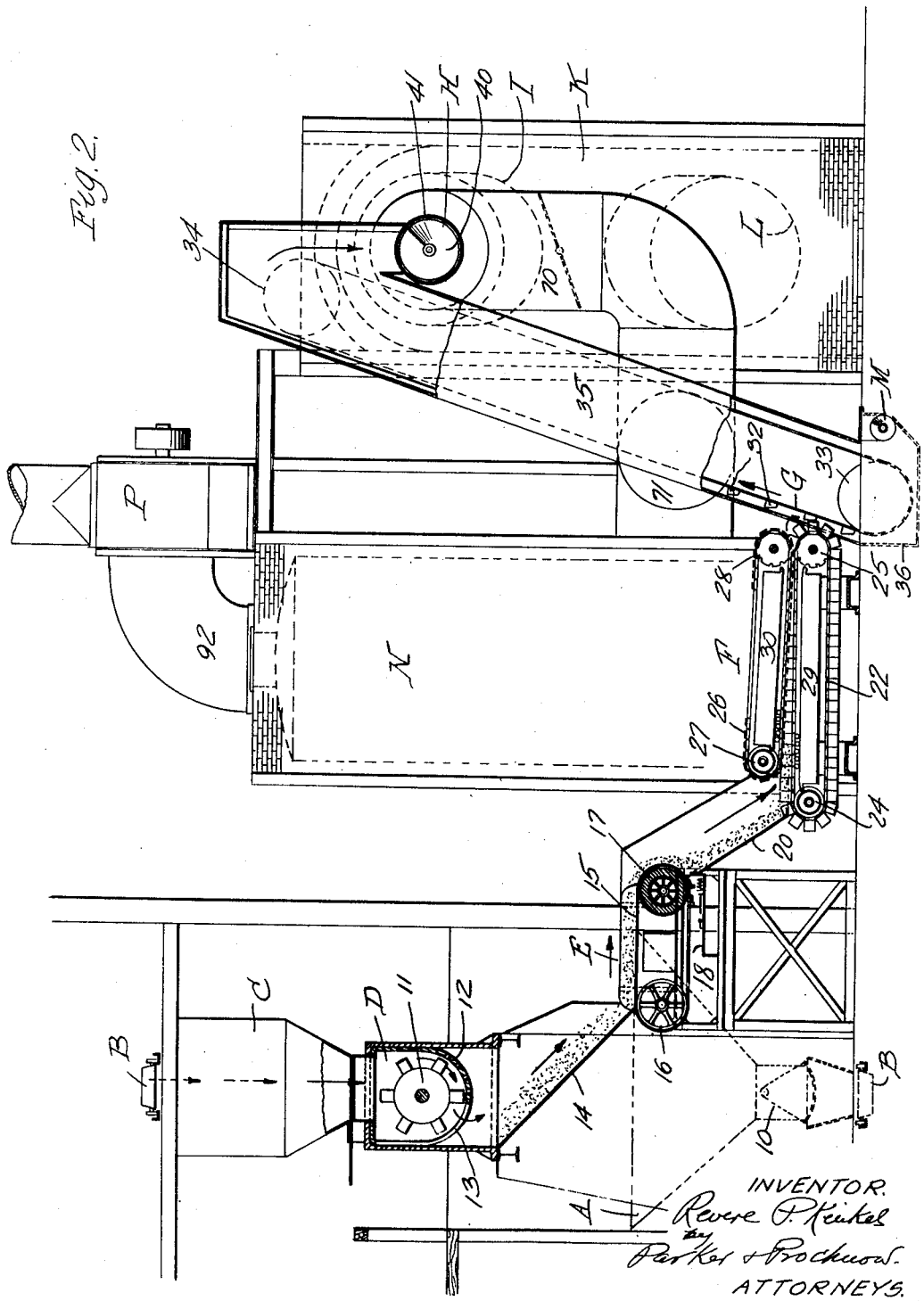

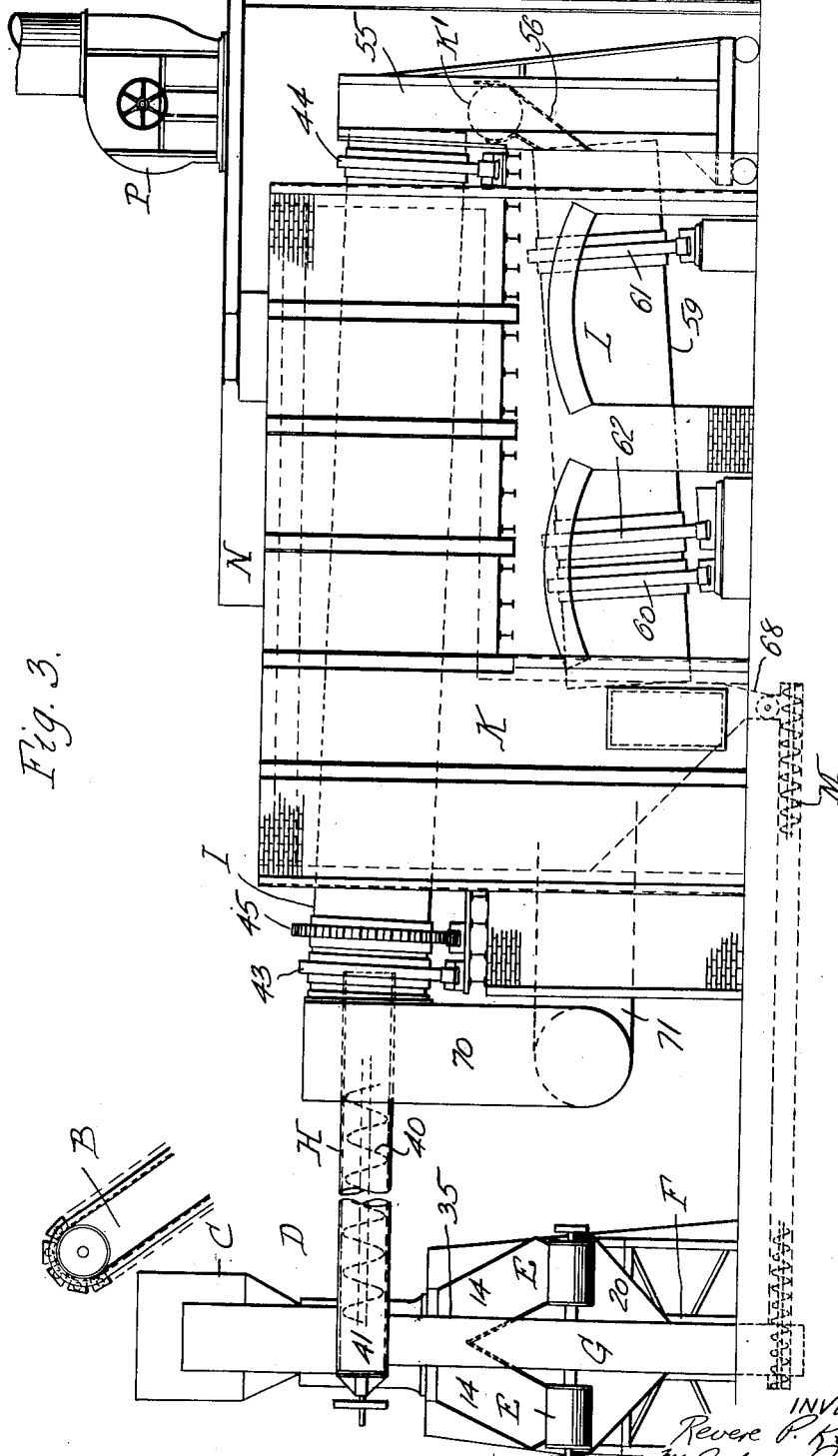

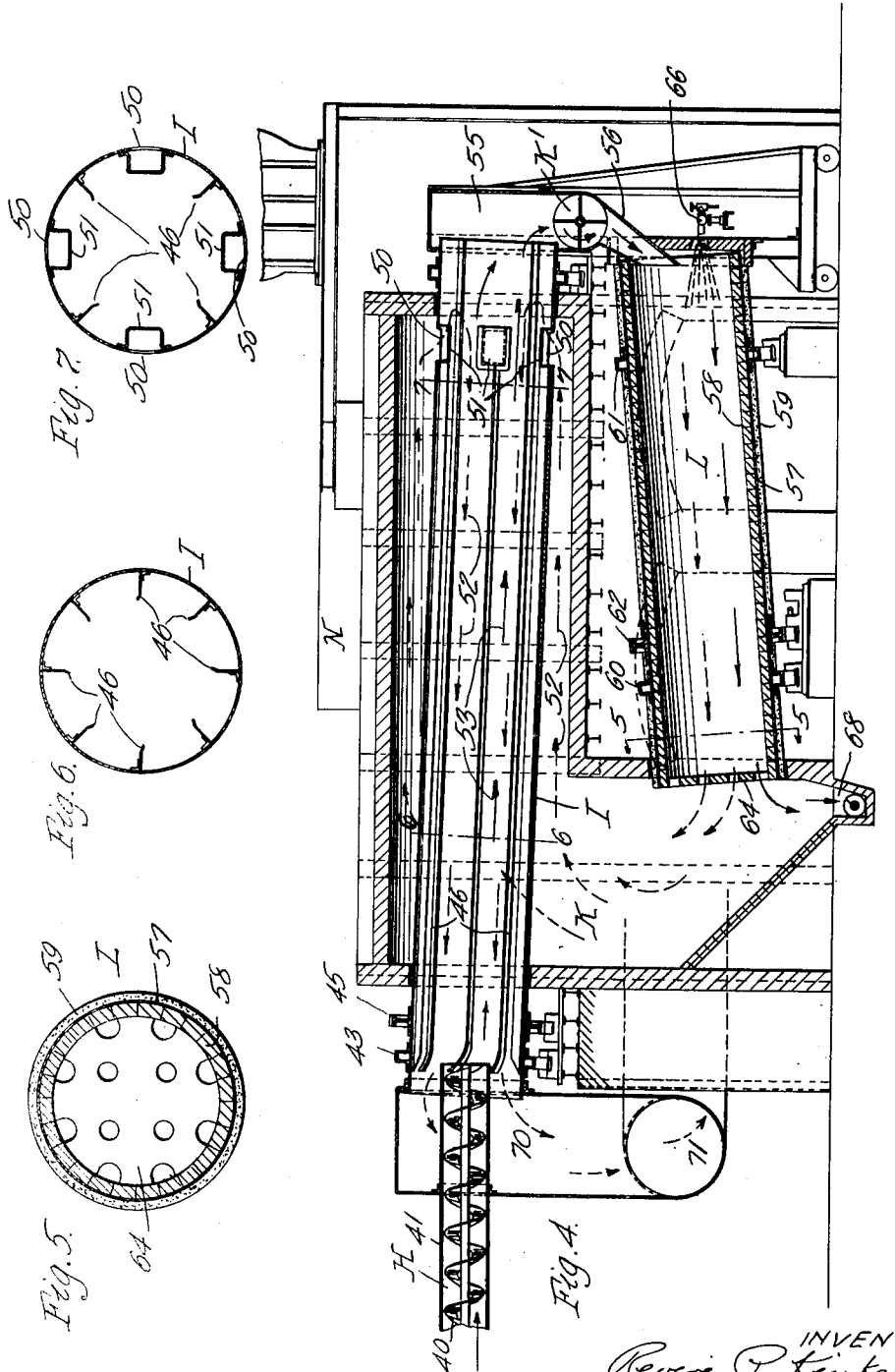

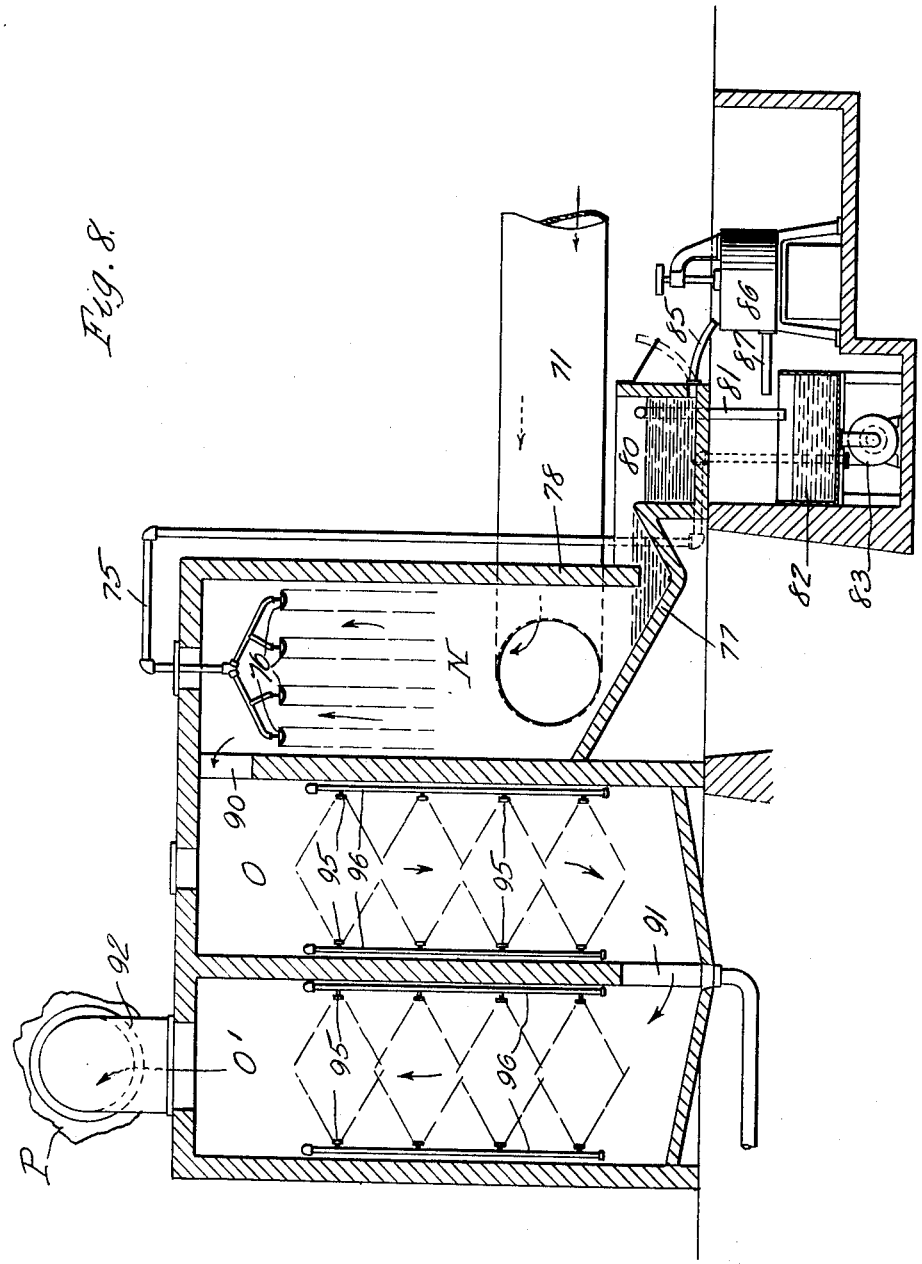

Patented Sept. 18, 1928.

1,684,448

UNITED STATES PATENT OFFICE.

REVERE P. KINKEL, OF BUFFALO, NEW YORK.

METHOD OF TREATING GARBAGE AND THE LIKE.

Application filed March 21, 1925. Serial No. 17,409.

This invention relates to processes and apparatus for use in connection with the disposal and treatment of garbage and certain other waste materials.

The objects of this invention are to provide a process of this kind in accordance with which the garbage is first thoroughly dried and then burned in such a manner that the heat of combustion of the garbage is used in the drying and treating of the garbage; also to provide a process of this kind in which ammonia is recovered from the garbage whether the same is in the form of free ammonia, or combined in the form of ammonia or nitrogen compounds; also to provide a process of this kind in which lime or other alkali is used to liberate the fixed or combined ammonia, and in which the lime or other alkali may be recalcined during the burning of the dry garbage so that the lime or other alkali may be used repeatedly in the process, whereby the cost of treating garbage is greatly reduced; also to provide improved apparatus for carrying out this process; also to improve processes and apparatus of this kind in other respects hereinafter specified.

Heretofore in the disposal of garbage, efforts have usually been made to recover the fats and oils. The recovery of these products, however, in nearly all instances costs more than the price that can be obtained for the fats and oils. Consequently in my improved method of disposing of garbage no attempt is made to recover the fats and oils, but these materials are efficiently used, because of their high fuel value, by burning the same, together with other material contained in the garbage, and using the heat evolved in the burning of the dried garbage in connection with the drying of garbage and in the recovery of ammonia from the garbage, which ammonia may be combined with a cheap spent acid to form an ammonium salt which is of high value as a fertilizer.

In the accompanying drawings;

Fig. 1 is a plan view partly in section of a garbage disposal plant or apparatus wherein my improved process is carried out.

Fig. 2 is an end view thereof, partly in section.

Fig. 3 is a side view thereof.

Fig. 4 is a fragmentary sectional elevation thereof on line 4—4, Fig. 1, showing the drier and incinerator.

Fig. 5 is a fragmentary transverse sectional elevation of the incinerator on line 5—5, Fig. 4.

Figs. 6 and 7 are transverse sectional elevations of the drier on lines 6—6 and 7—7 respectively of Fig. 4.

Fig. 8 is a longitudinal sectional elevation on line 8—8, Fig. 1.

In the carrying out of my process the garbage is dumped into a series of hoppers or bins A, which may be of any suitable or desired construction and which have discharge openings in their lower portions adapted to discharge the garbage to a conveyor or elevator B. The conveyor or elevator B may be of any suitable or desired kind, preferably of the drag type, and each of the hoppers A may be provided with a suitable valve or gate, such as indicated at 10 in Fig. 2, or other means for controlling the discharge of garbage or other material from the hoppers to the conveyor B. The conveyor discharges the material to a feed hopper C, Fig. 2, arranged above a macerating or shredding machine D. This macerating or shredding machine may be of any suitable construction, that shown being of a type now commonly used for macerating and shredding other materials and which has been found to operate very satisfactorily on garbage and other waste products, and includes a rotary member 11 which is preferably driven by any suitable source of power, not shown, and which cooperates with a housing or casing 12 having a discharge opening 13 therein, through which the shredded or macerated garbage is discharged from the machine. The material leaves the discharge opening 13 of the shredding machine D in a finely divided form, so that no lumps or large pieces of material are left therein and this finely divided material is then passed to magnetic separators E, by any suitable means such, for example, as the inclined chutes 14, which feed the material by gravity to the separators E. The magnetic separators E are of well known construction and by themselves constitute no part of this invention. Briefly stated, each separator includes an endless belt 15 which travels over two wheels or pulleys 16 and 17, the pulley 17 being suitably magnetized so that any iron or other magnetic material in the garbage will adhere thereto as clearly shown in Fig. 2 until the belt 15 passes out of engagement with the pulley 17, whereupon the magnetic particles are dropped upon the platform 18 from which they may be discharged from the apparatus in any suitable or desired manner. The macerator or shredder D is of such construction that particles of iron or other metal can pass through the same without damage to this machine and such iron pieces can be more efficiently separated from the garbage after the same has been macerated than while the same is in a coarse condition.

The garbage, after leaving the magnetic separator, passes down another inclined chute 20 to a water expelling device or press F in which a large percentage of the moisture contained in the garbage is eliminated therefrom and discharged to a drain, since this liquid contains practically no materials of value. Any suitable means for expelling moisture from the garbage may be employed, the press shown being of a standard well known construction and operating continuously. Briefly stated, the press or moisture removing device includes a pair of belts of suitable construction, a lower belt 22 operating over pulleys 24 and 25 and an upper belt 26 operating over pulleys 27 and 28, which may be driven from any suitable source of power, not shown. It will be noted that the upper run of the belt 22 and the lower run of the belt 26 converge and these two runs of the belts are held in correct converging relation to each other by suitable converging plates or pressure members 29 and 30 respectively. Since the wet shredded garbage passes between the belts at the portions thereof which are separated to the greatest extent, it will be evident that as the belts converge, the material between the belts will be subjected to pressure, which causes a large percentage of the moisture to be expelled therefrom. This step of the process reduces greatly the amount of heat that is ultimately necessary to dry the garbage so that the same can be burned.

The material discharged from the press F is delivered to a conveyor G, that shown in Fig. 2 being in the form of an endless chain or belt passing over pulleys 33 and 34 and provided with buckets 32. The conveyor or elevator G is arranged in a housing 35, the lower portion 36 of which forms a chamber adapted to receive lime, alkali or ash, as will hereinafter be explained, small portions of the lime, alkali or ash being picked by the buckets of the conveyor or elevator G, before they receive the garbage from the press F. The conveyor G drops the material which it has received from the press F and any lime or alkali which the conveyor may have picked up in the lower portion 36 of the housing 35, into a feed conveyor H, which in the construction shown includes a screw 40 operating in a tube or housing 41, the open or discharge end of which terminates in a drier of any suitable or desired construction such as a rotary drying kiln or drum I. The drying drum is arranged at a slight inclination and is continuously rotated during the carrying on of the process so that the material is gradually fed from the receiving end to the discharge end of the drying drum. The drying drum is preferably provided near the opposite ends thereof with suitable bearings 43 and 44 on which the drying drum is rotatably supported, and a gear 45 secured to the drum may engage with a pinion driven from any desired source of power (not shown) to impart rotation to the drum. The interior of the drying drum is preferably provided with a series of radially extending ribs or projections 46 arranged longitudinally of the drum, which serve to agitate the material and carry the same upwardly during the rotation of the drum and drop the same through the space in the drum so that the material is repeatedly subjected to the drying action of air currents passing through the drum.

The drying drum is heated partly by hot air and gases surrounding the outside of the drum and also by passing the same hot air and gases through the interior of the drum. For this purpose the intermediate portion of the drying drum is preferably arranged in a heating chamber K, so that the ends of the drier extend out of the chamber and the intermediate portion thereof is subjected to the heat in the chamber, the walls of the heating chamber being preferably constructed of brick or other material which does not readily conduct heat. Near the lower or discharge end of the drier and within the heating chamber K are arranged ports which are so constructed as to receive the hot gases from the heating chamber K and at the same time prevent the material in the drier from passing out through these ports. A plurality of these ports may be arranged about the periphery of the drier, four ports being shown as illustrated in Figs. 4 and 7, and each of these ports 50 is covered by a sheet metal guard or protector 51 which is opened only toward the discharge end of the drier, so that the hot gases may pass through the ports and through the open ends of the guards 51 into the drier, and the guards prevent any of the material which is being dried from falling through the ports 50. The drier or drum I is preferably made of sheet metal so that the heat in the chamber K may readily be transmitted through the walls of the drier to the material therein, and further heat is transmitted to the material by the gases passing through the ports 50 and which pass through the drier as indicated by the broken line arrows 52, which is in a direction opposite to the direction of travel of the garbage indicated by the full line arrows 53. During the drying of the garbage, the liberation of free ammonia contained therein is greatly facilitated by the addition of alkali and is carried off by the hot air and gases passing through the drier, and the fixed ammonia, or ammonia compounds are acted upon by the lime or other alkali mixed with garbage, so that ammonia is also liberated from these ammonia or nitrogen compounds and is carried off by the hot air and gases passing through the drier.

It has been found that the exterior heating of the drier by means of the hot air and gases in the heating chamber K forms a film of steam along the sides of the drier which prevents the material from adhering to the sides, and by first bringing the hot gases into contact with the portion of the drier which contains the wettest garbage, these gases are cooled off sufficiently to prevent charring of the dry material at the lower end of the drier. This liberation of the fixed ammonia takes place at a temperature of under 500° C. By use of the apparatus as described no careful control of this temperature is necessary since even if the gases enter the drier at a temperature in excess of 500° C., at which temperature ammonia would be broken up, the gases nevertheless before reaching the portion of the garbage in which ammonia is being liberated will be reduced in temperature due to the large amount of heat required for the evaporation of moisture in the garbage, so that the maximum point of chemical reaction can be at any point within the range of the length of the drier, and yet due to the heat distribution no dissociation of the ammonia gas will take place. Another advantage of adding alkali to the garbage is that the alkali unites with the greases or fatty acids in the garbage and form a less volatile product, so that greases are not collected in other parts of the apparatus, but pass through the drier without change.

The garbage, after reaching the lower part of the drier I, passes through a rotary sealing gate K' of any suitable or well known construction which permits the dry products discharged from the drier I to pass through the passage 55 in which the sealing gate K' is located and prevents the passage of the gaseous products or heated air through this gate. The sealing gate K' discharges the dry products through a chute 56 to an incinerator L which may also be of any suitable or desired construction but which is preferably of a rotary type so that the process may be carried on continuously. In the construction shown, the incinerator is in the form of a metal drum 57 preferably lined with suitable fire brick or other heat resisting material 58, and the incinerator may, if desired, be covered on its outer surface with a heat insulating covering 59. The incinerator in the construction shown is provided with a pair of bearing rings 60 and 61 which cooperate with suitable bearings, and a ring gear 62 is preferably also secured to the drum, which may be driven by any suitable means to impart rotary motion to the incinerator. A plate 64 of carborundum or other heat resisting material and provided with any desired number and size of perforations is preferably provided at the lower or discharge end of the drier, which end extends into the heating chamber K, so that the ash or solid products of combustion as well as the gaseous products of combustion are discharged into the heating chamber K. The incinerator is preferably operated at a high temperature, for example, at a red heat so that complete combustion of all organic material takes place, as well as the destruction of a certain proportion of obnoxious gases which would be evolved if combustion took place at a lower temperature.

Heat may be supplied to the incinerator in any suitable or desired manner. In the construction shown an oil discharge or spray nozzle or burner 66 is shown at the upper or intake end of the incinerator, although it will be understood that other heating means may be provided. This burner is used primarily for starting the operation of the incinerator and the extent to which heat may be added to the incinerator through the oil burner or other heating device 66 depends upon the fuel value of the garbage which is being fed to the incinerator, and suitable automatic temperature controlled means (not shown) of any well known type may be employed to regulate the amount of fuel supplied to the incinerator by means of the burner or heating device 66.

By maintaining the temperature in the incinerator at the red heat a further reaction results, namely, that the lime or other alkali which was added to the garbage before the same was introduced into the drier, which alkali during the liberation of ammonia was converted into a carbonate or other compound, is reconverted or calcined in the incinerator into basic alkali and can thus again be used in the process for liberating ammonia, thus effecting a very considerable saving in the material required for the disposal of the garbage, since the lime or other alkali added to the garbage is used repeatedly during the continuation of the process and as the accumulation of ash, due to the burning of the garbage increases some of this ash can be removed from time to time and sold as fertilizer since this ash is high in potash and phosphate, which have a ready market as fertilizers. The ash which is discharged from the incinerator L, gathers in a pit 68 and may be fed by a conveyor M of any suitable type to the lower portion 36 of the housing in which the elevator G is arranged where the ashes again mix with the garbage fed to the drier. The hot gases and volatile products of combustion discharged from the incinerator pass upwardly in the heating chamber K around the drier I and then through the ports 50 thereof and lengthwise of the drier to the upper end thereof, these gases collecting ammonia and water vapor during their passage through the drier. At the discharge end of the drier the gases are conducted by conduits or passages 70, 71 to an ammonia recovery device.

The collection and absorption of ammonia is preferably effected by means of an acid tower N in which the gases discharged from the passage 71 are brought into contact with an acid, such, for example, as sulphuric acid, resulting in the forming of an ammonium salt, such as ammonium sulphate, which is a valuable fertilizer. The acid tower or recovery device N may be of any suitable or desired construction, that shown including a chamber into which acid is introduced near the upper portion and passes in a shower or in finely divided streams to the bottom thereof, the acid being fed by means of a pipe 75, Fig. 8, extending into the upper portion of the chamber N which is provided with any desired number of branch pipes, each of which discharges acid to a baffle or other distributing device 76, from which the acid drops in finely divided streams through the chamber N, and in doing so combines with the ammonia contained in the gas passing into the lower part of the chamber N from the pipe or conduit 71. Since ammonia has a decided affinity for sulphuric acid or other acids, the construction disclosed can be depended upon to remove most or all ammonia from the gas. It will be understood, however, that other means for bringing the gases into contact with acids may be provided if desired. The acid which drips through the chamber N collects at the bottom 77 thereof which is provided with a depressed portion which forms a seal with the lower end of the wall 78 of the chamber N and the material collecting in the bottom 77 of the chamber N may overflow into a tank 80 in which the crystals of ammonium sulphate may be permitted to settle. The tank 80 is provided with an overflow pipe 81, which discharges the clear acid collecting in the top of the tank 80 into an acid tank 82, from which the acid may be fed to a pump 83 of any suitable kind which passes the same upwardly through the pipe 75 to the top of the acid chamber N. From time to time as the crystals of ammonium sulphate accumulate in the bottom of the tank 80, the material from this tank may be withdrawn by means of a pipe or flexible tube 85 into a separator 86 which may be of any suitable or well known type, a centrifugal separator being indicated in Fig. 8. The pipe or flexible tube 85 when not employed to discharge the material from the tank 80 may be placed into the upwardly inclined dotted line position indicated in Fig. 8. In the separator 86 the liquid acid is separated from the crystals of ammonium sulphate and the acid is discharged through a pipe 87 into the acid tank 82 from which it may be recirculated by the pump 83 and the crystals of ammonium sulphate are removed from the separator 86 and may, if desired, be washed or further refined and dried.

The acid used in connection with this portion of the process is preferably a cheap spent sulphuric acid which may, for example, be a by-product from nitration processes. In addition to separating the ammonia from the gases, certain obnoxious odors are also destroyed by the action of the hot sulphuric acid passing through the current of gases in a counter current flow. If, during the carrying out of this process, crystals of ammonium sulphate form along the walls of the tower or chamber N or in the pumping and piping system, the ammonium sulphate can be readily removed by pumping a quantity of water through the system. The water dissolves the crystals readily and no trouble is experienced in removing the water from the acid since the gases entering the chamber N through the pipe 71 are of such a temperature as to readily evaporate any water which might be added to the acid and ammonium sulphate. The heat of the acid also prevents any condensation of the water vapor which is carried through the pipe 71, so that no concentration of the ammonium sulphate is necessary.

The gases after passing through the chamber N pass out of this chamber through an opening 90 in the upper portion thereof and then contain no other materials to be recovered and can be discharged to the atmosphere, if desired. Preferably, however, the gases are washed to purify the waste gases and remove all odors therefrom, as well as to condense steam or water vapor carried in these gases, which frequently carries objectionable compounds. In the construction shown a pair of washing chambers are provided, the chamber O being arranged adjacent to the chamber N and receiving the gases at the upper portion thereof through the connecting opening 90. At the lower end of the chamber O is an opening 91 through which the gases pass into a chamber O' and then through a discharge conduit 92 which preferably contains a suction fan P, which fan is used to induce the flow of gases throughout the system. This fan may be of any suitable construction and may be driven by any suitable source of power and discharges the air and gases directly to the atmosphere.

The washing towers O and O' preferably contain a series of spray nozzles 95, receiving water from pipes 96 and spraying the same in the chambers O, O' so that the air passing through these chambers is brought into intimate contact with the water. The sprays of water cool the gases, remove solid matter and certain gases therefrom, as well as a small amount of acid vapor which may be carried over from the chamber N, and the water also condenses the water vapor carried by the gases and the volatile oils of the spent acid, so that practically all odors and obnoxious gases, such as hydrogen sulphide, are removed from the gases, which can be discharged to the atmosphere through the fan P in a substantially clean, odorless and fairly cool condition and which when discharged contain a large amount of carbon dioxide gas and air. Other forms of air washing apparatus may be used in place of those illustrated in the chambers O, O', or, if desired, this final step of washing may be omitted entirely.

The process described has the advantage that it is very inexpensive to operate since the materials recovered from the garbage practically pay for the cost of operating the process. The process may be carried out without discharging any odors to the atmosphere and the materials required for the recovery of ammonia are very inexpensive, such for example, as spent acid and lime, and furthermore the lime may be repeatedly used owing to the high temperature employed in the incinerator, which high temperature also has the advantage of producing gaseous products of combustion which are comparatively free from obnoxious odors and of ensuring complete combustion of the garbage. By the treatment of the garbage as described wherein those portions of the garbage which have comparatively high fuel value are conserved, comparatively little fuel is required to produce the heat necessary for carrying out the process since the thoroughly dried garbage itself produces a very considerable amount of heat. By passing the gases to be discharged to the atmosphere first through an acid shower and then through water sprays, all traces of objectionable gases and odors are removed. The operation of the system requires comparatively little attention and the process can be carried on with a minimum of labor. By macerating or shredding the garbage, all of the garbage is reduced to such small particles that they can readily be dried without case hardening or formation of a crust on the outside of the particles, which prevents drying of the interior thereof. Consequently when the garbage is discharged from the drier it is thoroughly dry and burns readily. All of the apparatus through which the garbage itself passes is continuous in its operation, so that there is no time lost in charging the apparatus or in waiting for a charge to be treated.

I claim as my invention:

1. A continuous process of treating garbage and the like, consisting of mixing the garbage with an alkali to liberate ammonia, subjecting the garbage to a current of hot gas to carry off the ammonia liberated and water vapor, and carrying the gas charged with ammonia and water vapor into contact with an acid in liquid form heated above the boiling point of water to form an ammonium salt without condensing the water vapor.

2. The hereindescribed process of treating garbage and the like, consisting of mixing the garbage with an alkali to liberate ammonia, subjecting the garbage to a current of hot gas to carry off the ammonia liberated, recovering the ammonia liberated and destroying odors in the hot gas, and burning, at a high temperature, the garbage from which the ammonia has been removed, at which temperature the alkali mixed therewith will be calcined and returning the calcined alkali to the garbage to be treated.

3. The hereindescribed method of treating garbage consisting of mixing the garbage with an alkali, subjecting the mixture to the drying action of a current of hot gas, which carries off the ammonia liberated by the reaction of the alkali with the garbage, recovering the ammonia carried off by said gas, and burning the dried garbage to produce heat for use in drying the garbage and aiding in liberating and recovering ammonia.

4. The hereindescribed process of treating garbage and similar materials, consisting of macerating the garbage, subjecting the garbage to a magnetic separator to remove magnetic materials therefrom, expelling the water from the macerated garbage, mixing the garbage from which some of the water has been expelled with an alkali, heating the garbage, passing a current of heated gas through the garbage to remove ammonia formed by the reaction between the alkali and the garbage, and removing ammonia from the hot gas.

5. The hereindescribed process of treating garbage and similar materials, consisting of macerating the garbage, subjecting the garbage to a magnetic separator to remove magnetic materials therefrom, expelling the water from the macerated garbage, mixing the garbage from which some of the water has been expelled with an alkali, heating the garbage, passing a current of heated gas through the garbage to remove ammonia formed by the reaction between the alkali and the garbage, removing ammonia from the hot gas, and burning the dried garbage at a high temperature at which the products of the reaction between the garbage and the alkali are again converted into an alkali, and returning the alkali to garbage which is about to be dried.

6. The hereindescribed method of treating garbage and similar material, consisting of reducing the garbage to a finely divided condition, compressing the garbage to remove excess water therefrom, mixing the garbage with an alkali, drying the garbage, passing a current of hot gases through the garbage during the drying thereof whereby ammonia liberated from the garbage is carried off by said gases, removing ammonia from said gases to form an ammonium salt, burning the dried garbage at a temperature at which the products of reaction between the alkali and the garbage are converted into alkali, adding the converted alkali to garbage before the same is dried, and conducting the heat resulting from the burning of the garbage to wet garbage for drying the same.

7. The hereindescribed method of treating garbage and similar material, consisting of subjecting the garbage to the drying action of a current of hot gases, recovering ammonia from said gases, burning the dried garbage, conducting the heat evolved during the burning to garbage which is being dried, to assist the drying thereof, and then using the residual heat in the ammonia recovery.

8. The hereindescribed process of treating garbage and the like, consisting of heating garbage mixed with an alkali, passing hot gases through the mixture to carry off ammonia liberated in the mixture and carrying off vapor evolved in the drying of the garbage, subjecting the gases to the action of a hot acid which removes ammonia from the gases and through which water vapor passes without condensation, and using the heat left in the gases after the drying operation to keep the acid hot.

9. The hereindescribed process of treating garbage and the like, consisting of passing hot gases through the garbage to carry off ammonia and dry the garbage, and subjecting the gases to the action of a liquid acid heated around or above the boiling point of water which removes ammonia from the gases without condensing the water vapor contained in the gases.

REVERE P. KINKEL.